United States Patent [19]

Yahagi

[11] Patent Number: 5,404,576
[45] Date of Patent: Apr. 4, 1995

[54] BASE STATION COVERAGE AREA CONTROL SYSTEM

[75] Inventor: Masahiko Yahagi, Tokyo, Japan

[73] Assignee: NEC Corporation, Tokyo, Japan

[21] Appl. No.: 987,963

[22] Filed: Dec. 11, 1992

[30] Foreign Application Priority Data

Dec. 13, 1991 [JP] Japan ................... 3-351915

[51] Int. Cl.$^6$ .............................................. H04B 7/00
[52] U.S. Cl. ................... 455/56.1; 455/33.1
[58] Field of Search ............... 455/33.1, 33.2, 33.3, 455/33.4, 54.1, 56.1, 62, 63, 34.1, 75, 64, 49.1, 50.1, 67.1, 67.3, 68, 70, 88; 379/59, 60, 63

[56] References Cited

U.S. PATENT DOCUMENTS

| | | | |
|---|---|---|---|
| 4,839,590 | 5/1989 | Ghose | 455/63 |
| 5,040,238 | 8/1991 | Comroe et al. | 455/56.1 |
| 5,179,720 | 1/1993 | Grube et al. | 455/33.4 |
| 5,187,806 | 2/1993 | Johnson et al. | 455/15 |
| 5,241,685 | 8/1993 | Bodin et al. | 455/56.1 |
| 5,247,701 | 9/1993 | Comroe et al. | 455/56.1 |
| 5,276,907 | 1/1994 | Meidan | 455/56.1 |

FOREIGN PATENT DOCUMENTS

0406905A2 1/1991 European Pat. Off. .
8301878 5/1983 WIPO .

OTHER PUBLICATIONS

"EIA Interim Standard" published by Electronic Industries Association, Mar. 1987.
J. A. Adams, "Total Access Communications System" published by British Telecom Research Laboratories, Oct. 1984.
Okumura et al., "Experimental Study of Propagation Characteristics in Land Mobile Radio Communication", Kenjitsuho, vol. 16, No. 8, 1967, pp. 1705-1764.

Primary Examiner—Edward F. Urban
Assistant Examiner—Nguyen Vo
Attorney, Agent, or Firm—Foley & Lardner

[57] ABSTRACT

In a mobile radio communication system in which a plurality of base stations, each having at least one communication channel, are arranged in a service area, and communication between mobile stations and the base stations is performed by using the communication channels, a base station coverage area control system includes noise sources. The noise sources are either arranged inside base stations or inside the service area to be located around the respective base stations. The noise sources generate noise having the same frequency as that of a communication signal from each of the base stations or at the selected frequency of one of the base stations. The coverage areas of the base stations are controlled by transmitting the controlled noise from the noise sources.

5 Claims, 2 Drawing Sheets

BASE STATION COVERAGE AREA CONTROL SYSTEM

BACKGROUND OF THE INVENTION

The present invention relates to a control system for an area covered by base stations and, more particularly, to a base station coverage area control system in a mobile communication system.

According to EIA (ELECTRIC INDUSTRIES ASSOCIATION) IS-3-D or TACS (TOTAL ACCESS COMMUNICATION SYSTEM) Issue-4 as specifications of a cellular mobile radio communication system, a plurality of base stations are arranged in a service area. Each base station has at least one communication channel, and communication between mobile stations and the respective base stations is performed by using the communication channels.

In order to increase the system capacity, the technique of frequency reuse is employed. In this technique, the same frequency is used by different base stations to increase the number of communication channels simultaneously used in the service area under the condition that signals transmitted from the respective base stations do not interfere with each other.

In this case, an installation plan of base stations is made in consideration of estimated system capacity, distribution of subscribers, and radio wave propagation characteristics in the service area (Okumura, et al., "Experimental Study of Propagation Characteristics in Land Mobile Radio Communication" Kenjitsuho, Vol. 16, No. 9, pp. 1705-1764, 1967). After this consideration, the following adjustment operations are performed: adjustment of the transmission output of each base station, adjustment of the horizontal directivity by using an omnidirectional antenna or a fan-beam antenna, and adjustment of the range by changing the directivity of an antenna in a horizontal or downward direction.

The respective adjustment operations described above, however, are performed at one point where a base station antenna exists. For this reason, if a local dead area due to a building or the like is present, the coverage areas of adjacent base stations using the same frequency are adversely affected to expand the dead area.

In addition, if the traffic intensity is locally increased as a function of time, proper distribution of communication channels between base stations is difficult to realize.

SUMMARY OF THE INVENTION

It is an object of the present invention to provide a base station coverage area control system, wherein a radio base station and a noise source for generating noise having the same frequency as that of a carrier signal transmitted from the radio station are arranged in a service area so that the size and shape of the coverage area of an adjacent base station can be changed by controlling the transmission output of the noise source.

It is another object of the present invention to provide a base station coverage area control system which can properly control the coverage areas of a plurality of base stations using the same frequency.

In order to achieve the above objects, according to the present invention, there is provided a base station coverage area control system in a mobile radio communication system in which a plurality of base stations, each having at least one communication channel, are arranged in a service area, and communication between mobile stations and the base stations is performed by using the communication channels, comprising noise sources, arranged inside the service area to be located around the respective base stations, for generating noise having the same frequency as that of a communication signal from each of the base stations, wherein coverage areas of the base stations are controlled by transmitting the controlled noise from the noise sources.

According to the first aspect of the present invention, when the noise sources generate noise upon controlling the noise intensity of the noise, the shape and area of the coverage area of a base station using the same frequency as that of the noise can be controlled.

According to the second aspect of the present invention, the shape and area of the coverage area of a given base station are changed when noise having the same frequency as that used by the base station is generated by an adjacent base station.

According to the third aspect of the present invention, when noise is generated by noise generating base stations, the coverage area of each base station using the same frequency as that of the noise is reduced.

DESCRIPTION OF THE PREFERRED EMBODIMENTS

The first embodiment of the present invention will be described below with reference to FIG. 1.

Figure 1:
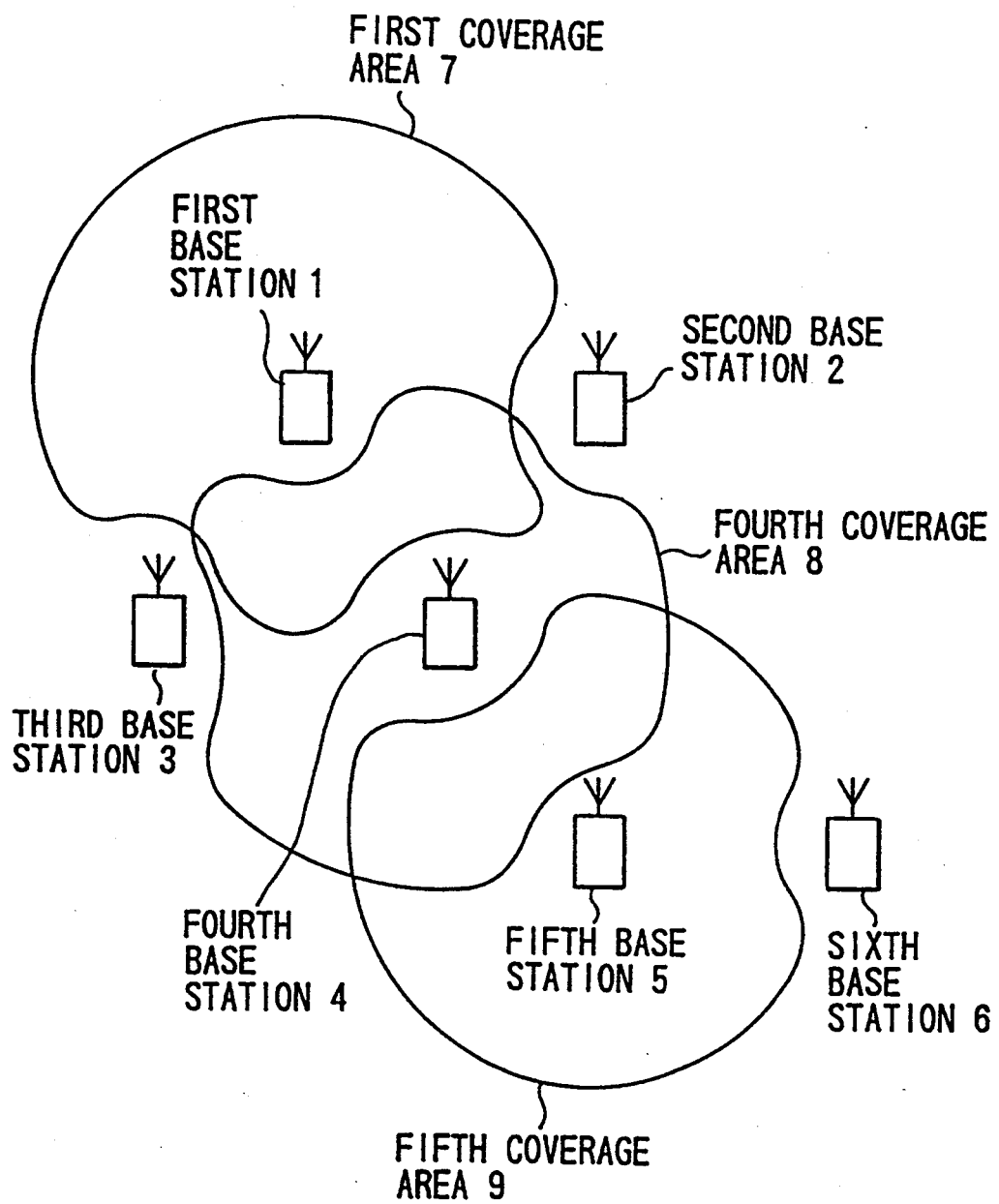
FIG. 1 is a view showing the coverage areas of base stations in a case wherein noise sources are arranged inside the base stations according to the first embodiment of the present invention.

FIG. 1 shows the coverage areas of base stations in a case wherein noise sources are arranged inside the base stations according to the first embodiment.

First and fifth base stations 1 and 5 are designed to transmit/receive a frequency group f1 and generate frequency groups f2, f3, and f4 as noise. Second and sixth base stations 2 and 6 are designed to transmit/receive the frequency group f2 and generate the frequency groups f1, f3, and f4 as noise.

Similarly, a third base station 3 transmits/receives the frequency group f3 and generates the frequency groups f1, f2, and f4 as noise. A fourth base station 4 transmits/receives the frequency group f4 and generates the frequency groups f1, f2, and f3 as noise.

In this base station arrangement, when noise is generated by all the base stations, i.e., the first to sixth base stations 1 to 6, the coverage area of the first base station 1 based on the frequency group f1 is given as a first coverage area 7. Similarly, the fourth and fifth base stations 4 and 5 have fourth and fifth coverage areas 8 and 9, respectively.

In this case, the shape and area of the first coverage area 7 can be changed by controlling the noise intensities of the frequency groups f1 generated by the second, third, and fourth base stations 2, 3, and 4 surrounding the first base station 1. Such a change in the noise intensity of only the frequency group f1 does not change the shape and area of the fourth coverage area 8 of the adjacent fourth base station 4 based on the frequency group f4.

In addition, directional antennas such as fan-beam antennas can be used in this system to change only the intensity of noise, of the frequency groups f1 as noise generated by the second, third, and fourth base stations adjacent to the first base station 1, which is directed toward the first base station 1. With this arrangement, the influence that changes the shape and area of the fifth coverage area 9 of the fifth base station 5 using the frequency group f1 can be reduced.

The shape and area of the first coverage area 7 of the first base station 1 can be dynamically changed by adjusting the noise intensities and radiating directions of noise generated by the second base station 2 and the like in the above-described manner without constructing an antenna and the like in the first base station 1. In addition, this method is more versatile than a method of changing the coverage area of the first base station 1 by adjusting the transmission intensity of the transmitter of the first base station 1.

The second embodiment of the present invention will be described below with reference to FIG. 2.

Figure 2:
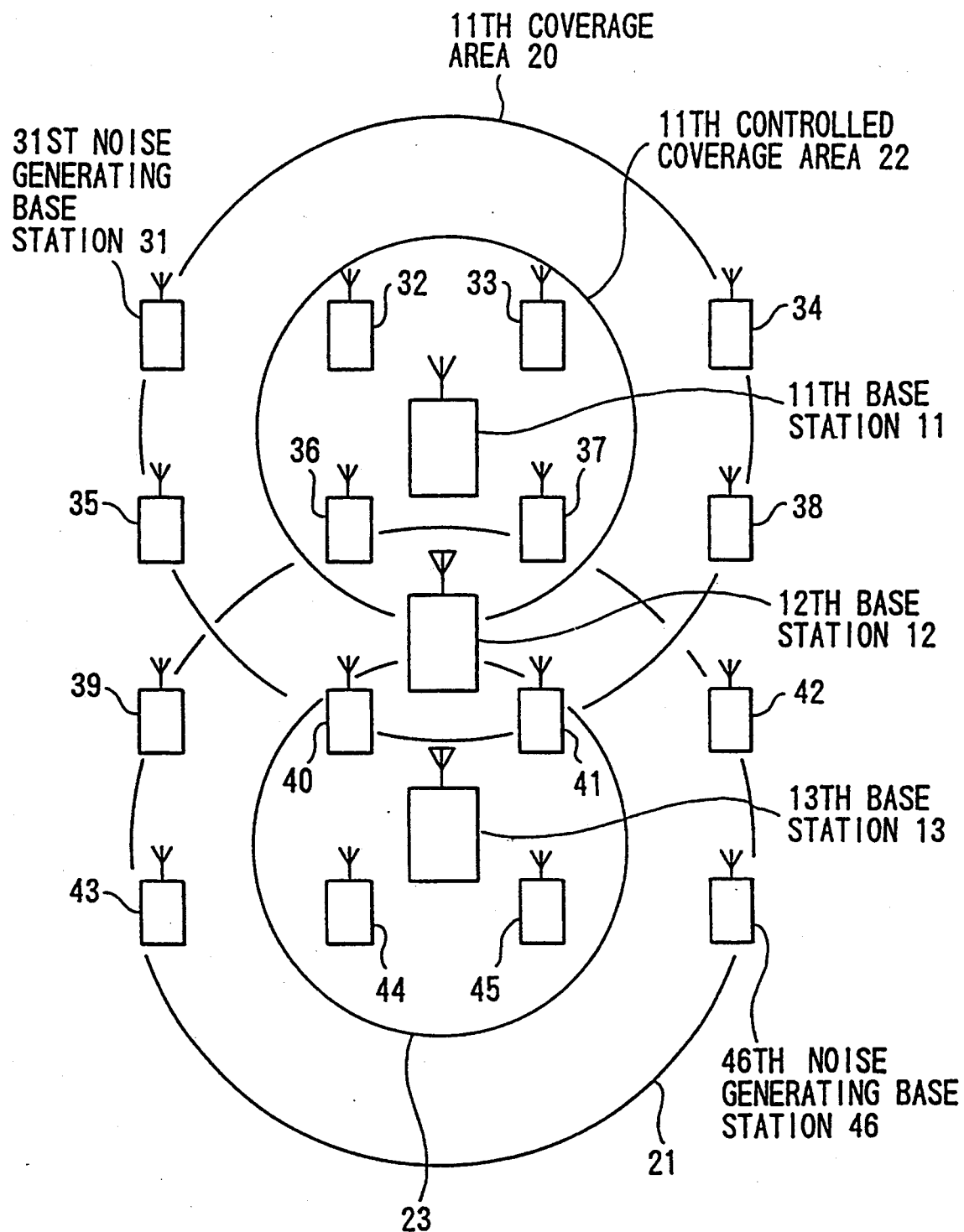
FIG. 2 is a view showing the coverage areas of base stations in a case wherein noise sources are arranged outside the base stations according to the second embodiment of the present invention.

FIG. 2 shows the coverage areas of base stations in a case wherein noise sources are arranged outside the base stations according to the second embodiment. 16 noise sources, i.e., 31st to 46th noise generating base stations 31 to 46 are arranged in the form of a lattice. Three base stations, i.e., 11th to 13th base stations 11 to 13, are evenly distributed inside the area of the above noise sources.

The 31st to 46th noise generating base stations 31 to 46 can generate noise while changing its noise intensity as needed. The 11th to 13th base stations 11 to 13 can transmit/receive signals having arbitrary frequencies, and can transmit/receive arbitrary frequency groups as needed.

11th and 13th coverage areas 20 and 21 are the coverage areas of the 11th base station 11 and 13th base station 13 when no noise is generated by the 31st to 46th noise generating base stations 31 to 46.

11th and 13th controlled coverage areas 22 and 23 are the controlled coverage areas of the 11th base station 11 and the 13th base station 13 when noise is generated by the 31st to 46th noise generating base stations 31 to 46.

In the above-described arrangement, when no noise is generated by the respective noise generating base stations, the 11th and 13th coverage areas 20 and 21 partly overlap each other. For this reason, the same frequency cannot be assigned to the corresponding base stations. When noise is generated by the noise generating base stations 31 to 46 at the same frequency as that used by base stations 11 and 13, the noise level in the service area is increased to narrow the ranges of frequencies used in the 11th and 13th coverage areas 20 and 21. As a result, the 11th and 13th controlled coverage areas 22 and 23 are set as the ranges of frequency groups used. With this operation, the coverage areas of the 11th and 13th base stations 11 and 13 do not overlap each other.

With the above-described system, the distance between base stations using the same frequency group can be decreased, and the density of communication channels per area can be adjusted.

In the conventional coverage area changing system, since the radiating direction, transmission output, and the like of each base station antenna are changed, the following problems are posed:

(1) the expansion of a dead area with a change in shape of a coverage area, and
(2) inability to respond to an increase in traffic within a short period of time. By using the system of the present invention, however, the shape of a coverage area can be arbitrarily changed within a short period of time.

Consequently, the subscriber traffic at any time point can be optimally controlled (to increase the subscriber accommodation capacity).

As has been described above, according to the first aspect of the present invention, coverage areas having various shapes and areas can be formed without changing the transmission output of a base station within the coverage area, the direction of the base station's antenna, and the like. In addition, when different mobile stations use communication channels of the same frequency, even if the distance of the mobile stations changes, variations in noise level can be reduced. Furthermore, a speech channel switching procedure for a mobile station which is engaged in speech communication within the coverage area of a given base station is not influenced by the moving state of a mobile station which is engaged in speech communication within the coverage area of another base station. Moreover, the frequency of a speech channel switching procedure for a mobile station which is engaged in speech communication within the coverage area of a given base station can be reduced.

According to the second aspect of the present invention, in an area where mobile stations concentrate, a large number of noise generating base stations are arranged so that the range of the carrier of a frequency group used by a corresponding base station can be adjusted in accordance with the degree of concentration of mobile stations by controlling the noise intensity. In addition, a proper distribution pattern of communication channels can be formed in accordance with the density of mobile stations which changes locally with time.

According to the third aspect of the present invention, the overlapping portion between the coverage areas of different base stations using the same frequency can be eliminated.

What is claimed is:

1. A base station coverage control system in a mobile radio communication system in which a plurality of base stations, each having a coverage area corresponding to at least one of a plurality of communication channels, are arranged in a service area, and communication between mobile stations and said base stations being performed by using a communication frequency for each of the communication channels, said base station control system comprising:

noise sources arranged inside the service area, said noise sources generating noise having a same frequency as that of at least one of said plurality of communication channels, wherein the coverage area of a corresponding communication channel of a base station is controlled by selectively transmitting noise from at least one of said noise sources at a frequency corresponding to said corresponding communication channel of said base station.

2. A base station coverage area control system according to claim 1, wherein said noise sources are arranged around and spaced apart from said base stations and at least one of said noise sources selectively generates noise at a communication frequency corresponding to a communication channel corresponding to one of said base stations to reduce the coverage areas of said one of said base stations.

3. A base station coverage area control system in a mobile radio communication system in which a plurality of base stations, each having a coverage area using at least one of a plurality of communication channels, are arranged in a service area, and communication between mobile stations and said base stations is performed by using the communication channels, said base station coverage area control system comprising:
  noise sources, arranged inside the base stations, wherein each noise source transmits noise at a frequency different from a frequency corresponding to any communication channel used by the base station in which the noise source is located, the transmitted noise from each noise source changing a coverage area of a base station having a coverage area adjacent to a coverage area of the base station in which the noise source is located.

4. A method of increasing the density of base stations having a specified frequency in a mobile communication system, said method comprising the steps of:
  arranging a plurality of base stations in a service area, each of said base stations having a coverage area within which said base station communicates with one or more mobile stations;
  assigning each of said base stations at least one of a plurality of communications channels, wherein each of said plurality of communication channels is assigned with a corresponding frequency; and
  generating noise signals at a selected communication frequency for reducing the size of the coverage area of at least one of said base stations corresponding to said selected communication frequency.

5. A method of increasing the density of base stations having a specified frequency in a mobile communication system according to claim 4, wherein said generating step includes the step of adjusting at least one of a noise intensity of said noise signals and a radiating direction of said noise signals corresponding to said selected communication frequency.

* * * * *